(12) United States Patent
Tsutsumi et al.

(10) Patent No.: US 6,252,031 B1
(45) Date of Patent: Jun. 26, 2001

(54) PRODUCTION PROCESS FOR PRODUCING POLYURETHANE ELASTIC MATERIAL AND ELASTIC YARN

(75) Inventors: Nobuhisa Tsutsumi; Kenji Tamura; Mitsuhiko Yoshimoto, all of Tokushima (JP)

(73) Assignee: Nisshinbo Industries, Inc. (JP)

( * ) Notice: Subject to any disclaimer, the term of this patent is extended or adjusted under 35 U.S.C. 154(b) by 0 days.

(21) Appl. No.: 09/402,361

(22) PCT Filed: Jan. 30, 1998

(86) PCT No.: PCT/JP98/00400

§ 371 Date: Sep. 30, 1999

§ 102(e) Date: Sep. 30, 1999

(87) PCT Pub. No.: WO99/39030

PCT Pub. Date: Aug. 5, 1999

(51) Int. Cl.[7] .................................................... C08G 18/10
(52) U.S. Cl. ............................................... 528/65; 528/906
(58) Field of Search ....................................... 528/65, 906

(56) References Cited

FOREIGN PATENT DOCUMENTS

| 43-639 | 1/1968 | (JP) . |
|---|---|---|
| 46-42789 | 12/1971 | (JP) . |
| 57-101016 | 6/1982 | (JP) . |
| 57-101017 | 6/1982 | (JP) . |
| 59-179513 | 10/1984 | (JP) . |
| 2-75657 | 3/1990 | (JP) . |
| 06316617 | * 11/1994 | (JP) . |
| 7-300721 | 11/1995 | (JP) . |

* cited by examiner

*Primary Examiner*—Rachel Gorr
(74) *Attorney, Agent, or Firm*—Kilpatrick Stockton LLP

(57) ABSTRACT

A process for producing a polyurethane elastic material or polyurethane elastic yarn from a first polymer diol having a molecular weight of 600 or more, a second polymer diol having a molecular weight of 600 or more, a first low molecular weight diol having a molecular weight of 500 or less, a second low molecular weight diol, a first diisocyanate and a second diisocyanate as main starting materials, the total amount of the first diisocyanate and the second diisocyanate in the starting materials being 0.95 to 1.25 times the total molar amount of the first polymer diol, the second polymer diol, the first low molecular weight diol and the second low molecular weight diol, comprising the step of: extruding continuously extruding from a nozzle a polyurethane polymer in fluid state obtained by continuously reacting a prepolymer having hydroxyl-terminal obtained by reacting the first polymer diol, the first low molecular weight diol and the first diisocyanate, with a prepolymer having isocyanate-terminal obtained by reacting the second polymer diol, the second low molecular weight diol and the second diisocyanate.

12 Claims, No Drawings

US 6,252,031 B1

PRODUCTION PROCESS FOR PRODUCING POLYURETHANE ELASTIC MATERIAL AND ELASTIC YARN

FIELD OF THE INVENTION

The present invention relates to a process for producing a polyurethane elastic material, especially elastic yarn, by a reaction spinning method.

BACKGROUND ART

It is known that a polyurethane elastic material is produced by an extrusion molding method using thermoplastic polyurethane pellets produced from a polymer diol, a diisocyanate and a low molecular weight diol. However, as part of bonds in the polymer decompose during extrusion molding, a polyurethane elastic material which has satisfactory thermal properties such as residual starting permanent set after elongation in a high-temperature environment, especially polyurethane yarn having excellent thermal properties cannot be obtained by this method.

There are also known reaction spinning methods for the purpose of improving the thermal properties of polyurethane elastic yarn by a melt spinning method, such as one method in which a polymer diol, a diisocyanate and a low molecular weight diol are polymerized by a one-shot process and yarn is directly spun from this polymerization system, another method in which a prepolymer having isocyanate-terminal is reacted with a low molecular weight diol and yarn is directly spun from this reaction system. The elastic materials obtained by these reaction spinning methods are superior in thermal properties to an elastic material produced from pellets by a melt spinning method due to the low thermal history of the polymer. That is, in the melt spinning method using pellets, an isocyanate remaining in pellets after synthesis reacts with water contained in the air to form an urea group or a 3-dimensional bond by the reaction of an allophanate or biuret. The urea group and the 3-dimensional bond improve the thermal properties of the polymer but decompose during extrusion molding. It should be said that an elastic material obtained by a reaction spinning method can retain excellent thermal properties because the urea group and the 3-dimensional bond remain in the polymer as they are. However, as the reaction spinning method itself is liable to spin unstable polymer which is incomplete and in course of polymer synthesis, it is inferior in spinnability. Further, since a reactant is reacted with another reactant which greatly differs from it in viscosity and volume ratio while being mixed together, a large number of abnormal reaction products are easily produced by nonuniform mixing and it is difficult to measure a trace component accurately, whereby spinning stability is impaired and it is also difficult to obtain uniform polyurethane elastic yarn, especially uniform polyurethane elastic yarn of small denier.

In order to further improve the thermal properties of a polyurethane elastic material produced by a reaction spinning method, it is generally effective to increase the molar ratio of a diisocyanate to the total of a polymer diol and a low molecular weight diol. However, when the molar ratio of the diisocyanate is increased, the molecular weight of a polyurethane polymer does not become sufficiently high at the time of spinning, resulting in reduced spinnability. Therefore, the inventors of the present invention have proposed a method for improving spinnability by adding a special additive such as a diisocyanate dimer or fine powder silica to carry out a reaction spinning method for obtaining polyurethane elastic yarn from a prepolymer having isocyanate-terminal and a low molecular weight diol (Japanese Patent Publication Nos. 63-53287 and 63-53288). However, this method has a problem with the uniform dispersibility of these additives and such problems as a complicated process and difficulty of selecting mixing conditions at the time of a reaction.

There is also known a method for obtaining an elastomer such as a pellet by reacting a mixture of a polymer diol and a low molecular weight diol in an amount 1 to 3 times the molar amount of the polymer diol with an isocyanate to give a prepolymer having hydroxyl-terminal and a prepolymer having isocyanate-terminal and then reacting the two in order to reduce a difference in viscosity between the prepolymer having hydroxyl-terminal and the prepolymer having isocyanate-terminal so as to make mixing state well (Japanese Patent Publication No. 43-639). However, the elastomer obtained by this method is an elastomer for melt spinning which is molten and spun into yarn and it is not disclosed in the above publication that spinning is carried out by reacting raw materials such as polyols continuously.

DISCLOSURE OF THE INVENTION

It is an object of the present invention to solve the drawbacks of the above-mentioned prior art and to provide a process for stably producing a polyurethane elastic material having excellent thermal properties, especially elastic yarn, by a reaction spinning method.

That is, the present invention is a process for producing polyurethane elastic yarn from a first polymer diol having a molecular weight of 600 or more, a second polymer diol which may be the same or different from the first polymer diol and has a molecular weight of 600 or more, a first low molecular weight diol having a molecular weight of 500 or less, a second low molecular weight diol which may be the same or different from the first low molecular weight diol, a first diisocyanate and a second diisocyanate which may be the same or different from the first diisocyanate as main starting materials, the total molar amount of the first diisocyanate and the second diisocyanate in the starting materials being 0.95 to 1.25 times the total molar amount of the first polymer diol, the second polymer diol, the first low molecular weight diol and the second low molecular weight diol, comprising the step of:

extruding continuously from a nozzle a polyurethane polymer in fluid state obtained by reacting a prepolymer having hydroxyl-terminal obtained by reacting the first polymer diol, the first low molecular weight diol and the first diisocyanate with a prepolymer having isocyanate-terminal obtained by reacting the second polymer diol, the second low molecular weight diol and the second diisocyanate.

In the above production process, the second low molecular weight diol is preferably used in a molar amount less than 1.0 time the molar amount of the second polymer diol.

The present invention is also a process for producing a polyurethane elastic material from a first polymer diol having a molecular weight of 600 or more, a second polymer diol which may be the same or different from the first polymer diol and has a molecular weight of 600 or more, a first low molecular weight diol having a molecular weight of 500 or less, a second low molecular weight diol which may be the same or different from the first low molecular weight diol, a first diisocyanate and a second diisocyanate which may be the same or different from the first diisocyanate as main starting materials, the total molar amount of the first diisocyanate and the second diisocyanate in the starting materials being 0.95 to 1.25 times the total molar amount of the first polymer diol, the second polymer diol, the first low molecular weight diol and the second low molecular weight diol, and the molar amount of the second low molecular weight diol being less than 1.0 time the molar amount of the second polymer diol, comprising the step of:

extruding continuously from a nozzle a polyurethane polymer in fluid state obtained by reacting a prepolymer having hydroxyl-terminal obtained by reacting the first polymer diol, the first low molecular weight diol and the first diisocyanate with a prepolymer having isocyanate-terminal obtained by reacting the second polymer diol, the second low molecular weight diol and the second diisocyanate.

The present invention is further a process for producing polyurethane elastic yarn from a first polymer diol having a molecular weight of 600 or more, a second polymer diol which may be the same or different from the first polymer diol and has a molecular weight of 600 or more, a low molecular weight diol having a molecular weight of 500 or less, a first diisocyanate and a second diisocyanate which may be the same or different from the first diisocyanate as main starting materials, the total molar amount of the first diisocyanate and the second diisocyanate in the starting materials being 0.95 to 1.25 times the total molar amount of the first polymer diol, the second polymer diol and the low molecular weight diol, comprising the step of:

extruding continuously from a nozzle a polyurethane polymer in fluid state obtained by reacting a prepolymer having hydroxyl-terminal obtained by reacting the first polymer diol, the low molecular weight diol and the first diisocyanate with a prepolymer having isocyanate-terminal obtained by reacting the second polymer diol and the second diisocyanate.

The present invention is further a process for producing a polyurethane elastic material from a first polymer diol having a molecular weight of 600 or more, a second polymer diol which may be the same or different from the first polymer diol and has a molecular weight of 600 or more, a low molecular weight diol having a molecular weight of 500 or less, a first diisocyanate and a second diisocyanate which may be the same or different from the first diisocyanate as main starting materials, the total molar amount of the first diisocyanate and the second diisocyanate in the starting materials being 0.95 to 1.25 times the total molar amount of the first polymer diol, the second polymer diol and the low molecular weight diol, comprising the step of:

extruding continuously from a nozzle a polyurethane polymer in fluid state obtained by reacting a prepolymer having hydroxyl-terminal obtained by reacting the first polymer diol, the low molecular weight diol and the first diisocyanate with a prepolymer having isocyanate-terminal obtained by reacting the second polymer diol and the second diisocyanate.

In this description, unless otherwise stated, the "polymer diol" means a polymer diol having a molecular weight of 600 or more and the "low molecular weight diol" means a diol having a molecular weight of 500 or less.

In the above production process of the present invention, preferably, the prepolymer having hydroxyl-terminal is obtained by reacting the first polymer diol in an amount of 60 to 10 mol % based on the total amount of the first polymer diol and the second polymer diol, the first diisocyanate in an amount 1.3 to 2.5 times the molar amount of the first polymer diol and the first low molecular weight diol in an amount 2 times or more the molar amount of the first polymer diol, and the prepolymer having isocyanate-terminal is obtained by reacting the second polymer diol in an amount of 90 to 40 mol % based on the total amount of the first polymer diol and the second polymer diol and the second diisocyanate in an amount 2 times or more the molar amount of the second polymer diol.

In the production process of the present invention, the prepolymer having hydroxyl-terminal is preferably obtained by reacting the first polymer diol and the first diisocyanate to give a first precursor and then reacting the precursor and the low molecular weight diol. Further, when the second polymer diol, the second diisocyanate and the second low molecular weight diol are used to produce the prepolymer having isocyanate-terminal, the prepolymer having hydroxyl-terminal is preferably obtained by reacting the first polymer diol and the first diisocyanate to give a first precursor and then reacting the first precursor and the first low molecular weight diol, and the prepolymer having isocyanate-terminal is preferably obtained by reacting the second polymer diol and the second diisocyanate to give a second precursor and then reacting the second precursor and the second low molecular weight diol in an amount less than 1.0 time the molar amount of the second polymer diol.

In the production process of the present invention, preferably, the first polymer diol and the second polymer diol are each selected from the group consisting of polyether diols and polyester diols. Further, in the production process of the present invention, preferably, the first polymer diol is a polyether diol and the second polymer diol is a polyester diol.

The present invention further provides a polyurethane elastic material and elastic yarn produced by the above process.

The present invention will be described in detail hereinafter.

The most important point for spinning a polyurethane elastic material or elastic yarn (which may be referred to as "elastic material or the like" hereinafter) from a polymerization system directly is to realize an ideal mixing state in consideration of the reactivity of each of reactants. Especially when a polyurethane formed from a polymer diol, a diisocyanate and a low molecular weight diol is directly spun into elastic yarn from a polymerization system, a sufficient mixing effect cannot be expected from the viewpoint of the viscosity and volume ratio of each of the reactants as described in the foregoing even by employing any one of a one-shot process, a conventional prepolymer process in which a prepolymer having isocyanate-terminal is reacted with a low molecular weight diol (which may be referred to as "conventional prepolymer process" hereinafter) and a process in which an additive such as fine powder silica is used. Since there are many chances for a diisocyanate to react with a low molecular weight diol in a nonuniform mixing state, an abnormal reaction product is readily formed and it is difficult to measure a trace component accurately. As a result, such a problem as lack of spinning stability is essentially yet to be solved. It is desired that an ideal mixing state with few abnormal reactions should be realized in consideration of the viscosity and volume ratio of each of the reactants to produce an elastic material and elastic yarn.

The inventors of the present invention have conducted intensive studies to solve the above problem and have succeeded in improving reaction uniformity and spinning a polyurethane elastic material and elastic yarn having excellent thermal stability stably without special additives, by continuously extruding directly from a nozzle a polyurethane polymer in fluid state obtained by continuously reacting two different prepolymers having almost the same volume and relatively close viscosity each other, and by discovering ideal conditions for blending the two different prepolymers to accomplish the present invention.

One of the two different prepolymers is a prepolymer having hydroxyl-terminal obtained by reacting the first polymer diol, the first low molecular weight diol and the first diisocyanate. The other prepolymer is a prepolymer having isocyanate-terminal obtained by reacting the second polymer diol, the second low molecular weight diol and the second diisocyanate. The first polymer diol and the second polymer diol may be the same or different. The first low molecular weight diol and the second low molecular weight diol may be the same or different. Further, the first diisocyanate and the second diisocyanate may be the same or different.

In the production process of the present invention, the total molar amount of the first diisocyanate and the second diisocyanate is 0.95 to 1.25 times, preferably 1.03 to 1.15 times the total molar amount of the first polymer diol, the second polymer diol, the first low molecular weight diol and the second low molecular weight diol.

If the ratio of the total molar amount of the first diisocyanate and the second diisocyanate to the total molar amount of the first polymer diol, the second polymer diol, the first low molecular weight diol and the second low molecular weight diol covers-the above requirement, the weight proportion of the polymer diols, the diisocyanates and the low molecular weight diols in the polyurethane elastic material or the like can be changed variously according to the molecular weight of each of the above components and the desired properties of the elastic material. As for the weight proportion of the starting material components to obtain the prepolymer having hydroxyl-terminal, the amount of the first polymer diol is preferably 60 to 10 mol %, particularly preferably 50 to 15 mol % based on the total amount of the first and second polymer diols, the amount of the first diisocyanate is preferably 1.3 to 2.5 times, particularly preferably 1.8 to 2.1 times the molar amount of the first polymer diol, and the amount of the first low molecular weight diol is preferably 2 times or more, particularly preferably 4 times or more the molar amount of the first polymer diol. On the other hand, as for the weight proportion of the starting material components to obtain the prepolymer having isocyanate-terminal, the amount of the second polymer diol is preferably 90 to 40 mol %, particularly preferably 85 to 50 mol % based on the total amount of the first and second polymer diols, the amount of the second diisocyanate is preferably 2 times or more, particularly preferably 3 times or more the molar amount of the second polymer diol, and the amount of the second low molecular weight diol is preferably less than 1.0 time or-less, particularly preferably 0.5 time or less the molar amount of the second polymer diol.

When the amount of the first polymer diol used in the prepolymer having hydroxyl-terminal is 60 mol % or more based on the total amount, the viscosity of the prepolymer having hydroxyl-terminal is generally high at 10,000 cP or more (at a temperature of 70° C., the figures of viscosity below are values at 70° C. unless otherwise stated) and the viscosity of the prepolymer having isocyanate-terminal is generally low at 80 cP or less. When the amount of the first polymer diol used in the prepolymer having hydroxyl-terminal is 10 mol % or less based on the total amount, the viscosity of the prepolymer having hydroxyl-terminal is generally low at 500 cP or less and the viscosity of the prepolymer having isocyanate-terminal is generally high at 5,000 cP or more. Either case does not have so good influence upon the mixing state of the two different prepolymers: the prepolymer having hydroxyl-terminal and the prepolymer having isocyanate-terminal.

When the amount of the second low molecular weight diol used in the prepolymer having isocyanate-terminal is 1.0 time or more the molar amount of the second polymer diol, the viscosity of the prepolymer having isocyanate-terminal is generally high at 20,000 cP or more, which is liable to have great difference from the viscosity of the prepolymer having hydroxyl-terminal. This difference does not exert so good influence upon the mixing state of the two different prepolymers. Therefore, the amount of the second low molecular weight diol is preferably less than 1.0 time the molar amount of the second polymer diol. When spinning stability is attached special importance to, the amount of the second low molecular weight diol is more preferably 0.5 time or less the molar amount of the second polymer diol. Further, the choice of blending no second low molecular weight diol can be made.

The blending ratio of the diisocyanates into the two different prepolymers has great influence upon the formation of an abnormal reaction product at the time of synthesizing the prepolymer having hydroxyl-terminal and the viscosity of the prepolymer having hydroxyl-terminal. When the amount of the first diisocyanate used in the prepolymer having hydroxyl-terminal is more than 2.5 times the molar amount of the first polymer diol used in the prepolymer having hydroxyl-terminal, an abnormal reaction product formed by reacting the first low molecular weight diol and the first diisocyanate, is formed in the prepolymer having hydroxyl-terminal, whereby spinning stability is liable to deteriorate. On the other hand, when the amount of the first diisocyanate used in the prepolymer having hydroxyl-terminal is less than 1.3 times the molar amount of the first polymer diol used in the prepolymer having hydroxyl-terminal, the viscosity of the prepolymer having hydroxyl-terminal becomes high at 10,000 cP or more at 70° C., whereby the mixing state of the prepolymer having isocyanate-terminal and the prepolymer having hydroxyl-terminal becomes worse and does not have good influence upon spinning stability.

The prepolymer having hydroxyl-terminal and the prepolymer having isocyanate-terminal can be obtained by mixing and stirring every kind of starting material components at a predetermined reaction temperature for a predetermined reaction time. Stated more specifically, the polymer diol, the diisocyanate and the low molecular weight diol can be reacted with one another by a one-shot process. A more effective process includes a stepwise reaction process comprising the steps of reacting a polymer diol with a diisocyanate to form a precursor containing a prepolymer having an isocyanate-terminal and then reacting the obtained precursor with a low molecular weight diol to form a prepolymer having hydroxyl-terminal or a prepolymer having isocyanate-terminal.

In the case of the prepolymer having hydroxyl-terminal, for example, this stepwise process is carried out by reacting the first polymer diol in an amount of 60 to 10 mol % based on the total amount of the first and second polymer diols with the first diisocyanate in an amount 1.3 to 2.5 times the molar amount of-the polymer diol to give a first precursor and then reacting the first precursor with the first low molecular weight diol in an amount 2 times or more the molar amount of the first polymer diol. In the case of the prepolymer having isocyanate-terminal, for example, this process is carried out by reacting the second polymer diol in an amount of 90 to 40 mol % based on the total amount of the first and second polymer diols with the second diisocyanate in an amount 2 times or more the molar amount of the second polymer diol to give a second precursor and then reacting the second precursor with the second low molecular weight diol in an amount less than 1.0 time the molar amount of the second polymer diol.

Further, the prepolymer having isocyanate-terminal can be also obtained by reacting the second diisocyanate in an amount 2 times or more the molar amount of the second polymer diol in two steps by dividing it into two parts, one part in an amount 1.3 to 2.5 times, particularly preferably 1.8 to 2.1 times the molar amount of the polymer diol and the remaining part. Stated more specifically, it can be obtained by a stepwise reaction process, in which the second polymer diol in an amount of 90 to 40 mol % based on the total amount of the first and second polymer diols is first reacted with the second diisocyanate in an amount 1.3 to 2.5 times, particularly preferably 1.8 to 2.1 times the molar amount of the polymer diol to give a third precursor, and this third precursor is reacted with the second low molecular weight diol in an amount less than 1.0 time the molar amount of the second polymer diol to give a fourth precursor. This fourth precursor is then reacted with the residual amount of the second diisocyanate to give the prepolymer having isocyanate-terminal.

In the case of that the prepolymer having hydroxyl-terminal is to be obtained by a stepwise process, when the amount of the first diisocyanate used in the first-stage reaction of the prepolymer having hydroxyl-terminal is more than 2.5 times the molar amount of the first polymer diol, an abnormal reaction product such as $D(ID)_m$ molecules ($m \geq 2$) is liable to be existent in the prepolymer having hydroxyl-terminal in large quantities (D signifies a low molecular weight diol and I signifies diisocyanate in the abbreviation. The same shall apply hereinafter). If the amount of the first diisocyanate is less than 1.3 times that of the first polymer diol, a large amount of a diisocyanate monomer is contained and remains in the prepolymer having isocyanate-terminal, whereby an abnormal reaction product such as $I(DI)_n$ molecules ($n \geq 2$) is liable to be formed during a reaction between the prepolymer having hydroxyl-terminal and the prepolymer having isocyanate-terminal. That is, when the amount of the first diisocyanate is more than 2.5 times the molar amount of the first polymer diol and less than 1.3 times the molar amount of the first polymer diol, it does not exert good influence upon spinning stability.

The production conditions of the prepolymer having hydroxyl-terminal such as reaction temperature and reaction time may be controlled according to the types of the starting material components. For example, when the first polymer diol, the first diisocyanate and the first low molecular weight diol are reacted by a one-shot process, the reaction temperature is preferably 60 to 130° C., particularly preferably 80 to 120° C. and the reaction time is preferably 30 to 100 minutes, particularly preferably 50 to 70 minutes. When they are reacted by a stepwise process, the reaction temperature of a reaction between the first polymer diol and the first diisocyanate is preferably 60 to 130° C., particularly preferably 80 to 120° C. and the reaction time is preferably 30 to 100 minutes, particularly preferably 50 to 70 minutes. The reaction temperature of a reaction between the obtained first precursor and the low molecular weight diol is preferably 60 to 130° C., particularly preferably 80 to 100° C.

In the case of the prepolymer having isocyanate-terminal, for example, the second polymer diol may be reacted with the second diisocyanate in an amount 2 times or more the molar amount of the second polymer diol to give the second precursor. When the amount of the second low molecular weight diol to be reacted with this precursor is small, specifically less than 1.0 time the molar amount of the second polymer diol, an abnormal reaction product as described above is hardly formed, which causes no problem.

The production conditions of the prepolymer having isocyanate-terminal such as reaction temperature and reaction time may be controlled according to the types of the starting material components. For example, when the second polymer diol, the second diisocyanate and the second low molecular weight diol are reacted by a one-shot process, the reaction temperature is preferably 60 to 130° C., particularly preferably 80 to 120° C. and the reaction time is preferably 30 to 100 minutes, particularly preferably 50 to 70 minutes. When they are reacted by a stepwise process, the reaction temperature of a reaction between the second polymer diol and the second diisocyanate is preferably 60 to 130° C., particularly preferably 80 to 120° C. and the reaction time is preferably 30 to 100 minutes, particularly preferably 50 to 70 minutes. When the low molecular weight diol is further reacted with the obtained second precursor, the reaction temperature of a reaction between the obtained second precursor and the low molecular weight diol is preferably 60 to 130° C., particularly preferably 80 to 100° C. Stirring conditions or the like may also be suitably determined.

The viscosity of the prepolymer having hydroxyl-terminal and the prepolymer having isocyanate-terminal differ according to the types and blending ratio of the starting materials used, reaction temperature and the like. The types and blending ratio of the starting materials used are determined by the properties of a purpose-build polyurethane elastic material, however in the present invention, the weight proportion of each constituent components is adjusted so that the viscosity of the two different prepolymers should be relatively close to each other. The viscosity ratio of the two different prepolymers is preferably 10 times or less, more preferably 5 times or less, particularly preferably 4 times or less, and almost the same shall apply to the volume ratio.

The two different prepolymers described above are supplied into a reactor having a unit for supplying a reaction product to an outlet in a fixed ratio while they are mixed and stirred continuously for a fixed reaction time to form a polyurethane polymer and the obtained polyurethane polymer is extruded from a nozzle continuously while it takes the form of fluid, cooled and wound up to give a polyurethane elastic material. Elastic materials having various shapes like a fiber, tape, cord, tube and the like can be obtained according to the shape of the nozzle. The production process of the present invention is particularly effective when a fiber, that is, polyurethane elastic yarn is produced.

Preferred examples of the polymer diol having a molecular weight of 600 or more used in the production process of the present invention include, for example, condensates of dihydric alcohols such as ethylene glycol, propylene glycol, butylene glycol, hexanediol, neopentyl glycol, 3-methyl-1, 5-pentanediol and dicarboxylates such as adipic acid and sebacic acid; polyester glycols such as polycaprolactone; and polyether glycols obtained by ring opening polymerization of ethylene oxide, propylene oxide tetrahydrofuran and the like. These polymer diols may be used alone or in admixture of two or more.

When the molecular weight of the polymer diol is lower than 600, the elongation of the obtained elastic material is too low, which is not preferable. On the contrary, when the molecular weight of the polymer diol is too high, the elastic recovery deteriorates. However, since this is greatly entangled with other factors, it is difficult to determine which is the preferred upper limit. Generally speaking, the preferred range of molecular weight, which differs according to the types and amounts of the low molecular weight diol and the diisocyanate, is 600 to 3,000 in most cases.

The type of the polymer diol can be suitably selected according to required physical properties which differ according to application purpose. For example, when the first polymer diol and the second polymer diol are all polyester diols, the obtained polyurethane elastic material or elastic yarn is excellent in abrasion resistance, oil resistance, tear strength and the like. When the first polymer diol and the second polymer diol are all polyether diols, the obtained polyurethane elastic material or elastic yarn is excellent in hydrolysis resistance, fungus resistance and the like. Further, a polyester diol and a polyether diol may be used in combination to obtain the advantages of both polyester diol and the polyether diol.

When a polyester diol and a polyether diol are used in combination, both may be mixed together and used to produce a prepolymer having hydroxyl-terminal and a prepolymer having isocyanate-terminal. To effectively develop the physical properties of the both materials, it is preferred that a polyether diol should be used as the first polymer diol constituting the prepolymer having hydroxyl-terminal and a polyester diol should be used as the second polymer diol constituting the prepolymer having isocyanate-terminal. That is, it is observed that use of a larger amount of the polyester diol becomes more effective in improving the abrasion resistance, oil resistance, tear strength and the like of the polyurethane elastic material or the like, whereas blending of the polyether diol in an amount of 15 mol % or more based on the total amount of the polymer diols becomes effective in improving the fungus resistance of the polyurethane elastic material or the like. Therefore, to effectively develop the physical properties of the both materials, it is recommended to blend the polyester diol in a larger amount than the polyether diol in such a way that the polyether diol is used in an amount of 15 to 50 mol %, preferably 15 to 35 mol % and the polyester diol should be used in an amount of 85 to 50 mol %, preferably 85 to 65 mol % based on the total amount of the polymer diols. As for the blending of the polymer diols into the prepolymer having hydroxyl-terminal and the prepolymer having isocyanate-terminal, to reduce a difference in viscosity between the both prepolymers, a larger amount of a polymer diol is preferably blended into the prepolymer having isocyanate-terminal. To satisfy these, it is preferred that a polyether diol should be used as the first polymer diol constituting the prepolymer having hydroxyl-terminal and a polyester diol should be used as the second polymer diol constituting the prepolymer having isocyanate-terminal.

Preferred examples of the low molecular weight diol having a molecular weight of 500 or less used in the production process of the present invention include ethylene glycol, propylene glycol, butylene glycol, hexanediol, bis-β-hydroxyethoxybenzene, cyclohexane dimethanol and the like, out of which butylene glycol is particularly preferred. Preferred examples of the diisocyanate include tolylene diisocyanate, diphenylmethane diisocyanate, hydrides thereof, isophorone diisocyanate, hexamethylene diisocyanate and the like, out of which diphenylmethane diisocyanate is particularly preferred. The above low molecular weight diols having a molecular weight of 500 or less and the above diisocyanates may be used alone or in admixture of two or more.

In the production process of the present invention, optional components such as titanium oxide, ultraviolet absorbent and antioxidant which are generally used in the production of a polyurethane elastic material or the like, may be blended into the starting materials.

In the production process of the present invention, a polyurethane polymer in fluid state is obtained by mixing, stirring and continuously reacting the prepolymer having hydroxyl-terminal with the prepolymer having isocyanate-terminal and extruded from a nozzle continuously to give a polyurethane elastic material or yarn. That is, it can be said that the production process of the present invention is a kind of reaction spinning process.

A reactor for carrying out a reaction between the prepolymer having hydroxyl-terminal and the prepolymer having isocyanate-terminal may be a commonly used reactor and is not particularly limited if it has such a structure that it has no short path for its contents between an inlet for the above two different prepolymers and an outlet for a polyurethane polymer and has a unit for supplying the two different prepolymers to the outlet continuously mixing and stirring them with maintaining a predetermined reaction time. For mixing and stirring in the reactor, rotary stirrers such as a screw type and stirring blade type stirrers and static mixing stirrers may be used. Although such conditions as the reaction time and reaction temperature of a reaction of the prepolymer having hydroxyl-terminal and the prepolymer having isocyanate-terminal in the reactor may be controlled according to the types of the starting materials etc, the reaction time is preferably 1 to 90 minutes, particularly preferably 1 to 60 minutes and the reaction temperature is preferably 160 to 220° C., particularly preferably 180 to 210° C.

The function of the present invention will be described in detail hereinafter.

Since $D(ID)_m$ ($m \geq 2$), $I(DI)_n$ ($n>2$) and the like, which are the reaction products of the low molecular weight diol and the diisocyanate, generally have a high melting point and poor solubility in a prepolymer, and deteriorates spinning stability, it is necessary to eliminate the formation of the above compounds. On the other hand, a repeat of -IDID- as a hard segment is indispensable to the structure of the polyurethane elastic material or the like from the viewpoints of thermal properties and elasticity.

In the present invention, for example, 1.3 to 2.5 mols of the first diisocyanate based on 1 mol of the first polymer diol (to be abbreviated as P hereinafter) and an excessive molar amount of the first low molecular weight diol are reacted with each other to form a prepolymer having hydroxyl-terminal in mixed state of DIPID and D as much as possible, while a prepolymer having isocyanate-terminal in a mixed state of IPI and I is formed by reacting the second polymer diol with the second diisocyanate directly or further reacting this reaction product with the second low molecular weight diol.

When the two different prepolymers are reacted with each other in a reactor, the first low molecular weight diol contained in the prepolymer having hydroxyl-terminal and the second diisocyanate monomer contained in the prepolymer having isocyanate-terminal are first preferentially reacted with each other to form a hard segment having a repeated structure of -IDID- between DIPID and IPI in a well-balanced manner, whereby the polyurethane elastic material or elastic yarn obtained by the production process of the present invention achieves higher thermal performance than that of the polyurethane elastic material or elastic yarn obtained by the one-shot process or the conventional prepolymer process. Further, part of the low molecular diol is already consumed at the time of synthesizing the prepolymer having hydroxyl-terminal, part of the diisocyanate is also consumed in a reaction with the polymer diol, part of the diisocyanate is already consumed and part of the low molecular weight diol is also consumed (or not contained from the beginning) at the time of synthesizing the prepolymer having isocyanate-terminal, whereby the formation of an abnormal reaction product such as $D(ID)_m$ (m≧2), $I(DI)_n$ (n≧2) is greatly suppressed and spinning stability is improved compared with the one-shot process or the conventional prepolymer process.

The viscosity of a low molecular weight diol having a molecular weight of 500 or less is several tens of cP in molten state and the viscosity of a diisocyanate is extremely low at 10 cP or less in molten state. In contrast to this, the viscosity of a polymer diol is several hundreds of cP in molten state, which is much higher than the low molecular weight diols and the diisocyanates. In the conventional reaction spinning process of the polyurethane elastic material or the like, especially elastic yarn, each of the starting materials to be reacted which greatly differ in viscosity and have a volume ratio 10 times or more with one another are used directly and mixed together in a very short period of time with the result that an abnormal reaction product caused by nonuniform mixing is easily formed and thereby spinning stability is lacking.

In the present invention, the viscosity of the prepolymer having hydroxyl-terminal can be adjusted to almost a range of 500 to 10,000 cP at 70° C. and the viscosity of the prepolymer having isocyanate-terminal to almost a range of 800 to 5,000 cP by controlling the blending ratio of the polymer diol into the two different prepolymers used, for example, to the above-described range, thereby making it possible to improve spinning stability.

To further improve this effect, the above stepwise reaction process is preferably employed in synthesizing the prepolymer having hydroxyl-terminal. That is, the first polymer diol is reacted with the second diisocyanate in an amount 1.3 to 2.5 times, preferably 1.8 to 2.1 times the molar amount of the first polymer diol to form an IPI which is formed by reacting a polymer diol with diisocyanate at both ends of a polymer diol as much as possible, which is then reacted with an excessive molar amount of the low molecular weight diol to form a prepolymer having hydroxyl-terminal in mixed state of DIPID and D, thereby suppressing the formation of an abnormal reaction product and further improving spinning stability. In the synthesis of the prepolymer having isocyanate-terminal, the low molecular weight diol is preferably used in an amount less than 1.0 time the molar amount of the polymer diol from the view point-of spinning stability. Also in this case, a reaction is preferably carried out stepwise. In other words, IPI is formed, which is reacted with the low molecular weight diol form a prepolymer having isocyanate-terminal comprising IPIDIPI as the main component, thereby making it possible to suppress the formation of an abnormal reaction product.

Further, even when a polyester diol and a polyether diol which have low compatibility with each other are to be mixed together as the polymer diols, a prepolymer having isocyanate-terminal and a prepolymer having hydroxyl-terminal are independently formed in advance to achieve excellent mixed state of the both prepolymers as in the production process of the present invention with the result that a polyurethane elastic material having the advantages of the both polymer diols can be obtained.

BEST MODE FOR CARRYING OUT THE INVENTION

The following examples are given to further illustrate the present invention.

EXAMPLE 1

Twenty four parts by weight of diphenylmethane diisocyanate and 22 parts by weight of butylene glycol were continuously reacted with 100 parts by weight of polyethylene adipate having hydroxyl groups at both terminals (molecular weight of 2,100) with agitation at a reaction temperature of 115° C. for a reaction time of 60 minutes to give a prepolymer having hydroxyl-terminal. This prepolymer having hydroxyl-terminal had a viscosity of 4,000 cP at 70° C.

Meanwhile, 84 parts by weight of diphenylmethane diisocyanate was continuously reacted with 200 parts by weight of polyethylene adipate having hydroxyl groups at both terminals (molecular weight of 2,100) with agitation at a reaction temperature of 115° C. for a reaction time of 60 minutes to give a prepolymer having isocyanate-terminal. This prepolymer having isocyanate-terminal had a viscosity of 1,500 cP at 70° C.

One hundred forty six parts by weight of the thus obtained prepolymer having hydroxyl-terminal and 284 parts by weight of the obtained prepolymer having isocyanate-terminal were continuously injected into a scraped surface heat exchange reactor and mixed and stirred at a reaction temperature of 190° C. for a residence time of 30 minutes. The obtained viscous product was immediately extruded from a nozzle by a spinning pump and treated with a lubricant mainly composed of mineral oil and then the operation of winding up polyurethane elastic yarn of 40 denier at a rate of 500 m/min was carried out continuously for 7 days. The molar ratio of the total molar amount of the diols (polyethylene adipate and butylene glycol) to the diisocyanate (diphenylmethane diisocyanate), both used as the starting materials of the obtained polyurethane elastic yarn, was 1 to 1.12.

In the case of the production process of the present invention, thread breakage during spinning occurred 2 times which is less than half the number of times of thread breakage when spinning is carried out directly by the conventional one-shot process or prepolymer process. The elongation of the obtained polyurethane elastic yarn is 450% which is the same as that of those obtained by the conventional processes. When residual starting permanent set after 1 minute—treatment at 115° C. in elongation of 100% was measured, it was 30%, which is lower compared with 45% of those obtained by the conventional processes.

Comparing the viscosity ratio and volume ratio of each of the constituent components such as the starting materials or prepolymers when the above starting materials were used to carry out the process of the present invention and the conventional processes, these are shown below.

| <conventional process: one-shot process> | | |
| --- | --- | --- |
| constituent components | viscosity ratio | volume ratio |
| polymer diol | 110 | 12 |
| low molecular weight diol | 10 | 1 |
| diisocyanate | 1 | 4 |

<conventional process: prepolymer process>

| constituent components | viscosity ratio | volume ratio |
|---|---|---|
| prepolymer having isocyanate-terminal | 43 | 16 |
| low molecular weight diol | 1 | 1 |

<Example 1>

| constituent components | viscosity ratio | volume ratio |
|---|---|---|
| prepolymer having hydroxyl-terminal | 1.8 | 1 |
| prepolymer having isocyanate-terminal | 1 | 2 |

Physical properties were measured in accordance with the following methods. The same shall apply to the following examples. (viscosity)

The sample is heated at 70° C. for about 3 hours and the viscosity of the sample is measured using the B type viscometer of Tokyo Keiki Co., Ltd. (elongation (%): in the case of yarn)

A load of 0.1 g is given to the sample at a room temperature of 20° C. and a humidity of 65% to prepare a sample in an initial state with a grip length of 4 cm. This sample in the initial state is elongated at a rate of 30 cm/min until it breaks and the length "A" is obtained by subtracting the gripping length from the length of the sample at the time of break to calculate elongation from the following equation 1. Ten samples are measured for each type and the mean measurement values is taken as the elongation of the sample.

$$\text{elongation}(\%) = A/40 \times 100 \quad \text{equation 1}$$

(Elongation (%): in the Case of Tape)

The elongation (%) of a tape is measured in accordance with JIS standards (K 7311).

(Residual Starting Permanent Set (%))

A load of 0.1 g is given to the sample at a room temperature of 20° C. and a humidity of 65% to prepare a sample in an initial state with a grip length of 4 cm. The operation of elongating this sample in the initial state to a length of 16 cm and loosening it to 4 cm is repeated twice. Stress is measured during this operation, the stress and the elongation length are expressed on a chart, the elongation length "B" of the sample is caliculated when stress becomes null by loosening the sample second time, and the residual starting permanent set (%) is obtained from the following equation 2. Five samples are measured for each type and the mean measurement values is taken as the residual starting permanent set of the sample.

$$\text{residual starting permanent set}(\%) = B/40 \times 100 \quad \text{equation 2}$$

(Fungus Resistance)

Covering yarn is produced from the sample and woolly nylon (WN50/16/1) and knitted into a cylinder with a 360-warp knitting machine. This knitted cylinder is cut horizontally into each 7 cm wide as samples.

An appropriate amount of water is added to earth put through a sieve and mixed lightly, and the sample is buried in the earth, covered up and left at 24 to 26° C. After a predetermined period of time, the sample is taken out and pores (the existence of pores, the number of days, the number of pores, etc.) formed in the sample and the like are checked.

EXAMPLE 2

Twenty four parts by weight of diphenylmethane diisocyanate was reacted with 100 parts by weight of polyethylene adipate having hydroxyl groups at both terminals (molecular weight of 2,100) at a reaction temperature of 80° C. for a reaction time of 60 minutes to give a precursor. One hundred twenty four parts by weight of the obtained precursor was then continuously reacted with 33 parts by weight of butylene glycol with agitation at a reaction temperature of 115° C. for a reaction time of 60 minutes to give a prepolymer having hydroxyl-terminal. The prepolymer having hydroxyl-terminal had a viscosity of 5,000 cP at 70° C.

Meanwhile, 110 parts by weight of diphenylmethane diisocyanate was reacted with 200 parts by weight of polyethylene adipate having hydroxyl groups at both terminals (molecular weight of 2,100) continuously with agitation at a reaction temperature of 80° C. for a reaction time of 60 minutes to give a prepolymer having isocyanate-terminal. This prepolymer having isocyanate-terminal had a viscosity of 1,500 cP at 70° C.

One hundred fifty seven parts by weight of the thus obtained prepolymer having hydroxyl-terminal and 310 parts by weight of the obtained prepolymer having isocyanate-terminal were continuously injected into a scraped surface heat exchange reactor mixed and stirred at a reaction temperature of 190° C. for a residence time of 30 minutes. The obtained viscous product was immediately extruded from a nozzle by a spinning pump, treated with a lubricant mainly composed of mineral oil and then wound up to produce polyurethane elastic yarn of 70 denier. When the operation of winding up at a rate of 350 m/min was carried out continuously for 7 days, the obstructing of the nozzle was not seen at all. When the reactor was disassembled to inspect the inside of the reactor after the above 7-day experiment was repeated three times, the adhesion of an abnormal reaction product was not seen. The molar ratio of the total molar amount of the diols (polyethylene adipate and butylene glycol) to the diisocyanate (diphenylmethane diisocyanate), both used as the starting materials of the obtained polyurethane elastic yarn, was 1 to 1.05.

The elongation of the obtained polyurethane elastic yarn was 500%. When residual starting permanent set after 1 minute-treatment at 115° C. in an elongation of 100% was measured as the index of thermal performance, it was 35%.

EXAMPLE 3

Twenty four parts by weight of diphenylmethane diisocyanate and 28 parts by weight of butylene glycol were reacted with 100 parts by weight of polyethylene adipate having hydroxyl groups at both terminals (molecular weight of 2,100) continuously with agitation at a reaction temperature of 115° C. for a reaction time of 60 minutes to give a prepolymer having hydroxyl-terminal.

This prepolymer having hydroxyl-terminal had a viscosity of 4,500 cP at 70° C. Meanwhile, 96 parts by weight of diphenylmethane diisocyanate was reacted with 200 parts by weight of polyethylene adipate having hydroxyl groups at both terminals (molecular weight of 2,100) continuously with agitation at a reaction temperature of 115° C. for a reaction time of 60 minutes to give a prepolymer having isocyanate-terminal. This prepolymer having isocyanate-terminal had a viscosity of 1,800 cP at 70° C.

One hundred fifty two parts by weight of the obtained prepolymer having hydroxyl-terminal and 296 parts by weight of the obtained prepolymer having isocyanate-terminal were continuously injected into a screw extrusion molding machine, mixed and stirred at a reaction temperature of 190° C. for a residence time of 10 minutes. The obtained viscous product was immediately extruded from a slit nozzle by a spinning pump and treated with a lubricant obtained by dispersing fat into water with a surfactant and then the operation of winding up a polyurethane tape of 10,000 denier (width of about 6 mm and a thickness of about 180 μm) at a rate of 50 m/min was carried out continuously for 7 days. The molar ratio of the total molar amount of the diols (polyethylene adipate and butylene glycol) and the diisocyanate (diphenylmethane diisocyanate), both used as the starting materials of the obtained polyurethane tape, was 1 to 1.06.

In the case of the conventional method for extrusion molding of polyurethane resin pellets, 2 or 3 spots which are nonuniform in width are generally produced based on 10,000 m, mainly resulted from the nonuniform melting of the pellets during extrusion molding. In contrast to this, in the case of the process of the present invention, the spot nonuniform in width was reduced to one or less spot based on 100,000 m.

The elongation of the obtained polyurethane tape was 400% which is the same as that of those produced by the process of the prior art. The elongation of the obtained polyurethane tape was measured as the index of thermal performance of the tape when the tape was elongated and broken by placing a 3 mm-diameter iron ball heated at 130° C. on the tape. It was found that the elongation of the tape of the present invention was 150% when the elongation of a tape produced by the process of the prior art was 100%.

When residual starting permanent set after 1 minute-treatment at 115° C. in an elongation of 100% was measured, it was 50%.

EXAMPLE 4

Twenty four parts by weight of diphenylmethane diisocyanate was reacted with 100 parts by weight of polyethylene adipate at a reaction temperature of 115° C. for a reaction time of 60 minutes to give a precursor. One hundred twenty four parts by weight of the obtained precursor was then reacted with 28 parts by weight of butylene glycol continuously with agitation at a reaction temperature of 115° C. for a reaction time of 60 minutes to give a prepolymer having hydroxyl-terminal.

This prepolymer having hydroxyl-terminal had a viscosity of 4,500 cP at 70° C. Meanwhile, 96 parts by weight of diphenylmethane diisocyanate was reacted with 200 parts by weight of polyethylene adipate having hydroxyl groups at both terminals (molecular weight of 2,100) continuously with agitation at a reaction temperature of 115° C. for a reaction time of 60 minutes to give a prepolymer having isocyanate-terminal. This prepolymer having isocyanate-terminal had a viscosity of 1,800 cP at 70° C.

One hundred fifty two parts by weight of the obtained prepolymer having hydroxyl-terminal and 296 parts by weight of the obtained prepolymer having isocyanate-terminal were continuously injected into a screw extrusion molding machine, mixed and stirred at a reaction temperature of 190° C. for a residence time of 10 minutes. The obtained viscous product was immediately extruded from a slit nozzle by a spinning pump and treated with a lubricant obtained by dispersing fat into water with a surfactant and then the operation of winding up a polyurethane tape of 10,000 denier (width of about 6 mm and a thickness of about 180 μm) at a rate of 50 m/min was carried out continuously for 7 days. The molar ratio of the total molar amount of the diols (polyethylene adipate and butylene glycol) and the diisocyanate (diphenylmethane diisocyanate), both used as the starting materials of the obtained polyurethane tape, was 1.06 to 1.

In the case of the conventional method for extrusion molding of polyurethane resin pellets, 2 or 3 spots which are nonuniform in width are generally produced based on 10,000 m, mainly resulted from the nonuniform melting of the pellets during extrusion molding. In contrast to this, in the case of the process of the present invention, the spot nonuniform in width was reduced to one or less spot based on 300,000 m.

The elongation of the obtained polyurethane tape was 420%. The elongation of the obtained polyurethane tape was measured as the index of thermal performance of the tape when the tape was elongated and broken by placing a 3 mm-diameter iron ball heated at 130° C. on the tape. It was found that the elongation of the tape of the present invention was 160% when the elongation of a tape produced by the process of the prior art was 100%. When residual starting permanent set after 1 minute-treatment at 115° C. in an elongation of 100% was measured, it was 45%.

EXAMPLE 5

Seventy five parts by weight of diphenylmethane diisocyanate was reacted with 100 parts by weight of polytetramethylene glycol having hydroxyl groups at both terminals (molecular weight of 650) at a reaction temperature of 80° C. for a reaction time of 60 minutes to give a precursor. One hundred seventy five parts by weight of the obtained precursor was reacted with 58 parts by weight of butylene glycol continuously with agitation at a reaction temperature of 80° C. for a reaction time of 60 minutes to give a prepolymer having hydroxyl-terminal. This prepolymer having hydroxyl-terminal had a viscosity of 5,500 cP at 70° C.

Meanwhile, 173 parts by weight of diphenylmethane diisocyanate was reacted with 327 parts by weight of polyethylene adipate having hydroxyl groups at both terminals (molecular weight of 3,000) continuously with agitation at a reaction temperature of 80° C. for a reaction time of 60 minutes to give a prepolymer having isocyanate-terminal. This prepolymer having isocyanate-terminal had a viscosity of 1,300 cP at 70° C.

Two hundred thirty three parts by weight of the obtained prepolymer having hydroxyl-terminal and 500 parts by weight of the obtained prepolymer having isocyanate-terminal were continuously injected into a scraped surface heat exchange reactor, mixed and stirred at a reaction temperature of 190° C. for a residence time of 30 minutes. The obtained viscous product was immediately extruded from a nozzle by a spinning pump, treated with a lubricant mainly composed of mineral oil and then wound up to produce polyurethane elastic yarn of 20 denier. Polytetramethylene glycol was accounted for 59 mol % of the total amount of the polymer diols (polytetramethylene glycol and polyethylene adipate) used as the starting materials of the obtained polyurethane elastic yarn. The molar ratio of the total molar amount of the diols (polytetramethylene glycol, butylene glycol and polyethylene adipate) to the diisocyanate (diphenylmethane diisocyanate) was 1 to 1.10.

When the operation of winding up at a rate of 800 m/min was carried out continuously for 7 days, the obstructing of the nozzle was not seen at all. The elongation of the obtained polyurethane elastic yarn was 440%. When residual starting permanent set after 1 minute-treatment at 115° C. at an elongation of 100% was measured as the index of thermal performance, it was 35%.

The measurement result of fungus resistance was good at 28 days.

EXAMPLE 6

Fourty eight parts by weight of diphenylmethane diisocyanate was reacted with 100 parts by weight of polytetramethylene glycol having hydroxyl groups at both terminals (molecular weight of 1,000) at a reaction temperature of 80° C. for a reaction time of 60 minutes to give a precursor. One hundred fourty eight parts by weight of the obtained precursor was reacted with 54 parts by weight of butylene glycol continuously with agitation at a reaction temperature of 80° C. for a reaction time of 60 minutes to give a prepolymer having hydroxyl-terminal. This prepolymer having hydroxyl-terminal had a viscosity of 5,000 cP at 70° C. Meanwhile, 190 parts by weight of diphenylmethane diisocyanate was reacted with 445 parts by weight of polyethylene propylene adipate having hydroxyl groups at both terminals (molecular weight of 2,100, EG:PG =1:9) continuously with agitation at a reaction temperature of 80° C. for a reaction time of 60 minutes to give a prepolymer having isocyanate-terminal. This prepolymer having isocyanate-terminal had a viscosity of 2,000 cP at 70° C. Two hundred two parts by weight of the thus obtained prepolymer having hydroxyl-terminal and 708 parts by weight of the obtained prepolymer having isocyanate-terminal were continuously injected into a scraped surface heat exchange reactor, mixed and stirred at a reaction temperature of 190° C. for a residence time of 30 minutes. The obtained viscous product was immediately extruded from a nozzle by a spinning pump, treated with a lubricant mainly composed of mineral oil and then wound up to produce polyurethane elastic yarn of 20 denier. Polytetramethylene glycol was accounted for 32 mol % of the total amount of the polymer diols (polytetramethylene glycol and polyethylene propylene adipate). The molar ratio of the total molar amount of the diols (polytetramethylene glycol, butylene glycol and polyethylene propylene adipate) to the diisocyanate (diphenylmethane diisocyanate) was 1 to 1.05.

When the operation of winding up at a rate of 800 m/min was carried out continuously for 7 days, the obstructing of the nozzle was not seen at all. The elongation of the obtained polyurethane elastic yarn was 490%. Residual starting permanent set after 1 minute-treatment at 115° C. in an elongation of 100% was 30% as the index of thermal performance.

The measurement result of fungus resistance was good at 19 days. (For reference, the measurement result of fungus resistance when polymer diols produced by the prepolymer process in Comparative Example 2 were all polyester diols was 3 days.)

EXAMPLE 7

Twenty four parts by weight of diphenylmethane diisocyanate was reacted with 100 parts by weight of polytetramethylene glycol having hydroxyl groups at both terminals (molecular weight of 2,000) at a reaction temperature of 80° C. for a reaction time of 60 minutes to give a precursor. One hundred twenty four parts by weight of the obtained precursor was reacted with 60 parts by weight of butylene glycol continuously with agitation at a reaction temperature of 80° C. for a reaction time of 60 minutes to give a prepolymer having hydroxyl-terminal. This hydroxyl group-terminated prepolymer had a viscosity of 3,500 cP at 70° C. Meanwhile, 240 parts by weight of diphenylmethane diisocyanate was reacted with 500 parts by weight of polyethylene propylene adipate having hydroxyl groups at both terminals (molecular weight of 2,100, EG:PG=1:9) continuously with agitation at a reaction temperature of 80° C. for a reaction time of 60 minutes to give a prepolymer having isocyanate-terminal. This prepolymer having isocyanate-terminal had a viscosity of 1,800 cP at 70° C.

One hundred eighty four parts by weight of the obtained prepolymer having hydroxyl-terminal and 750 parts by weight of the obtained prepolymer having isocyanate-terminal were continuously injected into a scraped surface heat exchange reactor, mixed and stirred at a reaction temperature of 190° C. for a residence time of 30 minutes. The obtained viscous product was immediately extruded from a nozzle by a spinning pump, treated with a lubricant mainly composed of mineral oil and then wound up to produce polyurethane elastic yarn of 20 denier. Polytetramethylene glycol was accounted for 17 mol % of the total amount of the polymer diols (polytetramethylene glycol and polyethylene propylene adipate). The molar ratio of the total molar amount of the diols (polytetramethylene glycol, butylene glycol and polyethylene propylene adipate) to the diisocyanate (diphenylmethane diisocyanate) was 1 to 1.12.

When the operation of winding up at a rate of 800 m/min was carried out continuously for 7 days, the obstructing of the nozzle was not seen at all. When the reactor was disassembled to inspect the inside of the reactor after 7 days of continuous operation was repeated three times, the adhesion of an abnormal reaction product was not seen. The elongation of the obtained polyurethane elastic yarn was 420%. Residual starting permanent set after 1 minute-treatment at 115° C. in an elongation of 100% was 31% as the index of thermal performance.

The measurement result of fungus resistance was good at 18 days.

COMPARATIVE EXAMPLE 1

Spinning was carried out in accordance with the one-shot process using 100 parts by weight of polyethylene adipate (molecular weight of 2,100), 40 parts by weight of diphenylmethane diisocyanate and 8 parts by weight of butylene glycol. When the operation of winding up at a rate of 800 m/min was carried out, the obstructing of the nozzle occurred in one day. When the reactor was disassembled after continuous spinning, a large amount of an abnormal reaction product was adhered in the inside of the reactor. Residual starting permanent set after 1 minute-treatment at 115° C. in an elongation of 100% was 50% which is worse than the polyurethane elastic yarn obtained by the production process of the present invention.

COMPARATIVE EXAMPLE 2

Spinning was carried out in accordance with the conventional prepolymer process by reacting 100 parts by weight of polyethylene adipate (molecular weight of 2,100) with 40 parts by weight of diphenylmethane diisocyanate to give a prepolymer and then reacting the obtained prepolymer with 8 parts by weight of butylene glycol. When the operation of winding up at a rate of 800 m/min was carried out, the obstructing of a nozzle occurred in two days. Adhesion of an abnormal reaction product was seen in the inside of the reactor like Comparative Example 1. Residual starting permanent set after 1 minute-treatment at 115° C. in an elongation of 100% was 50% which is worse than the polyurethane elastic yarn obtained by the production process of the present invention.

Industrial Applicability

In the present invention, a polymerization reaction is carried out after a prepolymer having isocyanate-terminal and a prepolymer having hydroxyl-terminal are obtained, wherein the viscosity of the two are relatively close and the volume ratio of the two is almost 1 compared with that of the conventional process, thereby making it possible to uniformly mix reactants and to suppress the formation of abnormal reaction products with the result that spinning stability can be greatly improved.

Further, the formation of abnormal reaction products is suppressed by synthesizing the prepolymers in two steps and a stirring effect is improved by controlling the viscosity of the two prepolymers to the same level, thereby making it possible to further improve spinning stability.

Further, the blending ratio of the starting materials of the two different prepolymers in the present invention is excellent from the viewpoint of compatibility and can improve such quality as thermal performance and fungus resistance in addition to spinning stability.

What is claimed is:

1. A process for producing polyurethane elastic yarn from a first polymer diol having a molecular weight of 600 or more; a second polymer diol, which may be the same or different from the first polymer diol, and having a molecular weight of 600 or more; a first low molecular weight diol having a molecular weight of 500 or less; a second low molecular weight diol, which may be the same or different from the first low molecular weight diol; a first diisocyanate; and a second diisocyanate, which may be the same or different from the first diisocyanate; as main starting materials;

the total amount of the first diisocyanate and the second diisocyanate in the starting materials being 0.95 to 1.25 times the total molar amount of the first polymer diol, the second polymer diol, the first low molecular weight diol and the second low molecular weight diol; and the amount of second low molecular weight diol being less than 1.0 times the molar amount of the second polymer diol; comprising the steps of:

reacting the first polymer diol, in an amount of 60 to 10 mol % based on the total amount of the first polymer diol and the second polymer diol, and the first diisocyanate, in an amount of 1.3 to 2.5 times the molar amount of the first polymer diol, to give a first precursor, and then reacting the first precursor and the first low molecular weight diol, in an amount of 2 times or more the molar amount of the first polymer diol, to obtain a prepolymer having hydroxyl-terminal;

reacting the second polymer diol in an amount of 90 to 40 mol % based on the total amount of the first polymer diol and the second polymer diol, and the second diisocyanate, in an amount of 2 times or more the molar amount of the second polymer diol, to give a second precursor, and then reacting the second precursor and the second low molecular weight diol, in an amount less than 1.0 times the molar amount of the second polymer diol, to obtain the prepolymer having isocyanate-terminal; and extruding continuously from a nozzle a polyurethane polymer in a fluid state obtained by continuously reacting the prepolymer having hydroxyl-terminal with the prepolymer having isocyanate-terminal.

2. The process for producing polyurethane elastic yarn according to claim 1, wherein the first polymer diol and the second polymer diol are each selected from the group consisting of polyether diols and polyester diols.

3. A. The process for producing polyurethane elastic yarn according to claim 2, wherein the first polymer diol is a polyether diol and the second polymer diol is a polyester diol.

4. A process for producing polyurethane elastic material from a first polymer diol having a molecular weight of 600 or more; a second polymer diol, which may be the same or different from the first polymer diol, and having a molecular weight of 600 or more; a first low molecular weight diol having a molecular weight of 500 or less; a second low molecular weight diol, which may be the same or different from the first low molecular weight diol; a first diisocyanate; and a second diisocyanate, which may be the same or different from the first diisocyanate; as main starting materials;

the total amount of the first diisocyanate and the second diisocyanate in the starting materials being 0.95 to 1.25 times the total molar amount of the first polymer diol, the second polymer diol, the first low molecular weight diol and the second low molecular weight diol; and the amount of second low molecular weight diol being less than 1.0 times the molar amount of the second polymer diol; comprising the steps of:

reacting the first polymer diol, in an amount of 60 to 10 mol % based on the total amount of the first polymer diol and the second polymer diol, and the first diisocyanate, in an amount of 1.3 to 2.5 times the molar amount of the first polymer diol, to give a first precursor, and then reacting the first precursor and the first low molecular weight diol, in an amount of 2 times or more the molar amount of the first polymer diol, to obtain a prepolymer having hydroxyl-terminal;

reacting the second polymer diol in an amount of 90 to 40 mol % based on the total amount of the first polymer diol and the second polymer diol, and the second diisocyanate, in an amount of 2 times or more the molar amount of the second polymer diol, to give a second precursor, and then reacting the second precursor and the second low molecular weight diol, in an amount less than 1.0 times the molar amount of the second polymer diol, to obtain the prepolymer having isocyanate-terminal; and extruding continuously from a nozzle a polyurethane polymer in a fluid state obtained by continuously reacting the prepolymer having hydroxyl-terminal with the prepolymer having isocyanate-terminal.

5. The process for producing polyurethane elastic material according to claim 4, wherein the first polymer diol and the second polymer diol are each selected from the group consisting of polyether diols and polyester diols.

6. The process for producing a polyurethane elastic material according to claim 5, wherein the first polymer diol is a polyether diol and the second polymer diol is a polyester diol.

7. A process for producing polyurethane elastic yarn from a first polymer diol having a molecular weight of 600 or more; a second polymer diol, which may be the same or different from the first polymer diol, and having a molecular weight of 600 or more; a low molecular weight diol having a molecular weight of 500 or less; a first diisocyanate; and a second diisocyanate, which may be the same or different from the first diisocyanate; as main starting materials;

the total amount of the first diisocyanate and the second diisocyanate in the starting materials being 0.95 to 1.25 times the total molar amount of the first polymer diol, the second polymer diol and the low molecular weight diol; comprising the steps of:

reacting the first polymer diol, in an amount of 60 to 10 mol % based on the total amount of the first polymer diol and the second polymer diol, and the first diisocyanate, in an amount of 1.3 to 2.5 times the molar amount of the first polymer diol, to give a precursor, and then reacting the precursor and the low molecular weight diol, in an amount of 2 times or more the molar amount of the first polymer diol, to obtain a prepolymer having hydroxyl-terminal;

reacting the second polymer diol in an amount of 90 to 40 mol % based on the total amount of the first polymer diol and the second polymer diol, and the second diisocyanate, in an amount of 2 times or more the molar amount of the second polymer diol, to obtain the prepolymer having isocyanate-terminal; and extruding continuously from a nozzle a polyurethane polymer in a fluid state obtained by continuously reacting the prepolymer having hydroxyl-terminal with the prepolymer having isocyanate-terminal.

8. The process for producing polyurethane elastic yarn according to claim 7, wherein the first polymer diol and the second polymer diol are each selected from the group consisting of polyether diols and polyester diols.

9. The process for producing polyurethane elastic yarn according to claim 8, wherein the first polymer diol is a polyether diol and the second polymer diol is a polyester diol.

10. A process for producing polyurethane elastic material from a first polymer diol having a molecular weight of 600 or more; a second polymer diol, which may be the same or different from the first polymer diol, and having a molecular weight of 600 or more; a low molecular weight diol having a molecular weight of 500 or less; a first diisocyanate; and a second diisocyanate, which may be the same or different from the first diisocyanate; as main starting materials;

the total amount of the first diisocyanate and the second diisocyanate in the starting materials being 0.95 to 1.25 times the total molar amount of the first polymer diol, the second polymer diol and the low molecular weight diol; comprising the steps of:

reacting the first polymer diol, in an amount of 60 to 10 mol % based on the total amount of the first polymer diol and the second polymer diol, and the first diisocyanate, in an amount of 1.3 to 2.5 times the molar amount of the first polymer diol, to give a precursor, and then reacting the precursor and the low molecular weight diol, in an amount of 2 times or more the molar amount of the first polymer diol, to obtain a prepolymer having hydroxyl-terminal;

reacting the second polymer diol in an amount of 90 to 40 mol % based on the total amount of the first polymer diol and the second polymer diol, and the second diisocyanate, in an amount of 2 times or more the molar amount of the second polymer diol, to obtain the prepolymer having isocyanate-terminal; and extruding continuously from a nozzle a polyurethane polymer in a fluid state obtained by continuously reacting the prepolymer having hydroxyl-terminal with the prepolymer having isocyanate-terminal.

11. The process for producing polyurethane elastic material according to claim 10, wherein the first polymer diol and the second polymer diol are each selected from the group consisting of polyether diols and polyester diols.

12. The process for producing a polyurethane elastic material according to claim 11, wherein the first polymer diol is a polyether diol and the second polymer diol is a polyester diol.

* * * * *